Feb. 12, 1929.　　W. W. HAWKINS　　1,702,082
OSCILLATOR MAGNETO
Filed Feb. 20, 1922　　2 Sheets-Sheet 1

Inventor.
William W. Hawkins.
By Williams Bradbury
McCaleb & Pierce
Attys

Feb. 12, 1929.  1,702,082
W. W. HAWKINS
OSCILLATOR MAGNETO
Filed Feb. 20, 1922   2 Sheets-Sheet 2
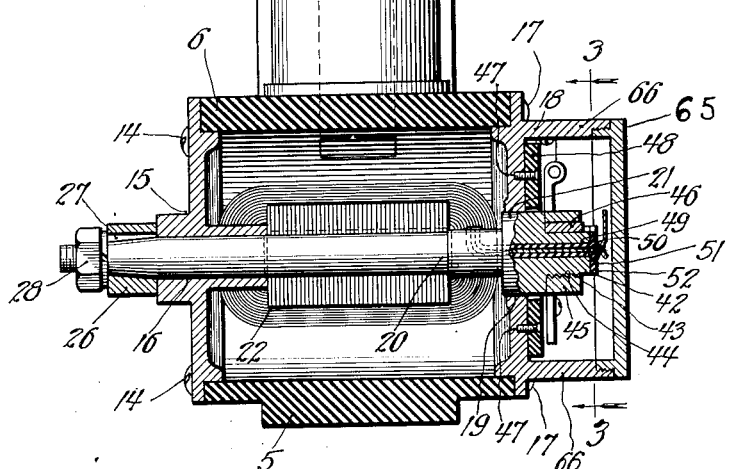
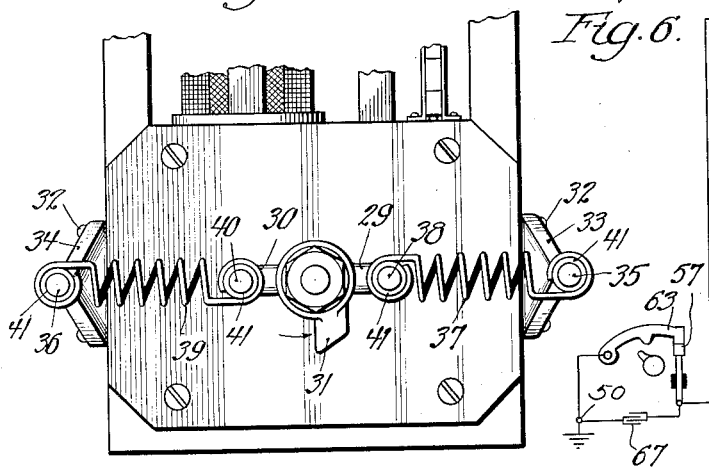
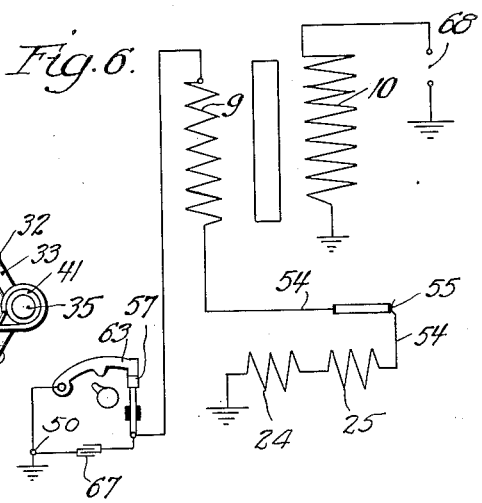
Inventor,
William W. Hawkins.
By Williams Bradbury
McCabe & Pierce  Attys Patented Feb. 12, 1929.

1,702,082

UNITED STATES PATENT OFFICE.

WILLIAM W. HAWKINS, OF BROOKLYN, NEW YORK, ASSIGNOR TO WEBSTER ELECTRIC COMPANY, OF RACINE, WISCONSIN, A CORPORATION OF WISCONSIN.

OSCILLATOR MAGNETO.

Application filed February 20, 1922. Serial No. 537,990.

This invention relates to magnetos of the type used for ignition purposes, and particularly to that type of ignition magneto in which the movable element of the magneto is periodically moved from its normal position by power and is snapped back to its normal position by some tension means. Magnetos of this type are commonly known as oscillators or oscillator magnetos.

Oscillator magnetos usually consist of a rotor element which is provided with a spring or springs normally tending to maintain the rotor in a definite normal position. In operation, the rotor is periodically rotated by some moving part of the mechanism to cocked position, and then released, permitting the spring or springs to quickly return the rotor to its normal position. In this rapid return movement, the magnetic lines of a field produced by some means, as a permanent magnet, are caused to change their position in relation to the magneto coil so as to produce an impulse of high potential current in the secondary coil of the transformer.

The object of the present invention is to provide a coil and armature arrangement by means of which large and rapid fluctuations of the lines of force through the primary coil of the transformer will be produced, thus producing in the secondary circuit an impulse of great intensity.

One of the features of the present invention is the arrangement of the core of the transformer in such relation to the pole pieces of the field producing magnet and the rotor element that the magnetic lines from the field magnet are caused to pass through the core when the rotor element approaches its normal position.

A further feature of the invention is the arrangement of the coils of the rotor and of the transformer such that in one position of the rotor, the magnetic lines pass through the transformer core in one direction, due to the flow of current in the primary coil from the coil on the rotor, and in another position of the rotor, the magnetic lines from the field magnet pass through the transformer coil core directly in the opposite direction.

Other features and advantages of the invention will appear from time to time as the description of the invention progresses.

In the drawings,

Figure 4 shows a vertical transverse section of the magneto.

Figure 5 is a view of a portion of the magneto looking from the left of Figure 4, and Figure 6 is a diagrammatic illustration of the circuits employed with the magneto.

Figure 1:
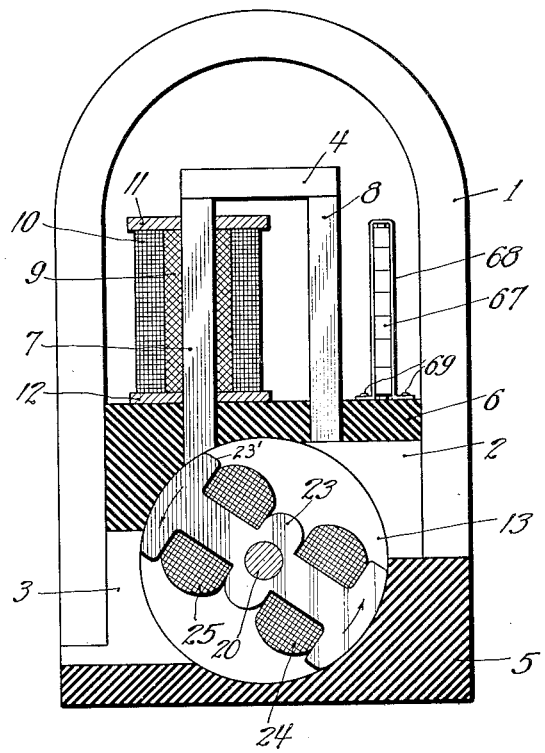
Figure 1 is a view through the magneto showing part of it in section. In this view, the rotor element is illustrated substantially in its normal position.

Referring now to the drawings, 1 indicates the permanent magnet provided with the pole pieces 2 and 3, preferably of laminations of magnetizable material. The core of the transformer is indicated at 4 and is preferably formed of sheets or laminations of magnetizable material. Portions of the base member are shown at 5 and 6. The core 4 is preferably of substantially U-shaped formation, and is provided with the legs 7 and 8. About leg 7 is wound the primary coil 9 and the secondary coil 10 of the transformer. Coils 9 and 10 are maintained in position on the leg 7 by means of the end members 11 and 12, which may be formed of fiber or other suitable insulating material. The magnet 1, its pole pieces 2 and 3, and the core member 4 may be fixed in position by casting the base, which includes the portions 5 and 6, about the magnet pole pieces and core ends, as shown in Fig. 1, a circular recess 13 being provided through the center of the assembly for the reception of the rotor element.

Secured to one end of the base portions 5 and 6, as by the screws 14, is an end plate 15 provided with a bearing portion 16. Secured to the opposite edges of the plate portions, as by the screws 17, is the end member 18 in which is provided the bearing portion 19. Extending through the bearings 16 and 19 and supported thereby is the rotor shaft 20, the shaft being provided with an enlarged portion 21 within the bearing 19.

Fixed to the shaft 20, in any desired manner, are the laminations 22 which form the armature 23 of the rotor element. This armature is provided with relatively wide peripheral segments 23' located at diametrically opposite sides of the rotor element. About the rotor armature 23 are wound the coils 24 and 25 which are in series and, therefore, are in effect one coil.

Rigidly secured to the left end of the shaft 20, as viewed in Fig. 4, is the collar 26. Collar 26 may be fixed to the tapered end of the shaft 20 by means of the spline 27 and the nut 28. The collar 26 is provided, as shown in Fig. 5, with laterally extending arms 29 and 30, and the downwardly extending trigger 31. Secured to the opposite sides of the magneto base, as by the screws 32, are the bracket members 33 and 34. The brackets 33 and 34 are provided with the outwardly extending lugs or studs 35 and 36 respectively. A coil spring 37 has one end extended about the lug 38 projecting from the arm 29, and the other end about lug 35. Spring 39 has one end formed to encircle the lug 40 projecting from the arm 30, and the other end arranged to encircle the lug 36. If desired, bearing collars 41 may be provided between the ends of the springs 37 and 39 and the several pivot lugs 35, 38, 40 and 36 respectively.

The shaft 20, beyond the enlarged portion 21, has a reduced portion 42, which is provided with the screw threads 43. Co-operating with the screw threads 43 are the threads 44 of the cam member 45. A spline 46 is provided to prevent rotation of the cam member 45 on the shaft after it has been screwed into position.

Secured to the end member 18, as by the screws 47, is the washer 48 of insulating material. One end of the shaft 20 is centrally bored and arranged therein is a rod 50 of conducting material. Positioned about the rod 50 and within the bore 49 is a sleeve or collar 51 of insulating material. The sleeve 51 is provided with an enlarged head 52 which overlies the end of the rotor shaft. One end of the rotor coil 24 is electrically connected to the conducting rod 50.

Fixed to the insulating washer 48 in any desired manner is the binding post 53 to which is secured the conductor 54, which extends to the primary coil 9. Also supported by the binding post 53 is a spring contact member 55, the free end of which is maintained in engagement with the projecting end of the conducting rod 50. Thus, it will be seen that at all times, the inductor coil 24 is connected through rod 50, contact spring 55, binding post 53, and conductor 54 to the primary coil 9.

Mounted on the insulating washer 48 is a second binding post 56, provided with an adjustable contact member 57 and a binding post cap 58. Pivotally supported on the screw 60, which may pass through the washer 48 and into the end plate 18, is the interrupter arm 61. Arm 61 is provided intermediate its ends with the cam follower 62 of insulating material which is arranged to co-operate with the cam 45. The arm 61 is provided at its free end with a contact 63 which is arranged to co-operate with the fixed contact 57.

The cam member 45 is provided in one face thereof with a depression 64, and when the follower 62 is positioned in the depression 64, the contacts 63 and 57 will be in engagement, but when the follower 62 is not positioned in the depression 64, the contacts 63 and 57 will be separated. A screw threaded cap member 65 is received by the screw threaded edge of the flange 66 of the end member 18 to provide a cover for the interrupter and other elements associated with the adjacent end of the rotor shaft. In Fig. 1, 67 indicates a condenser which is secured in position by means of the clip 68 secured to the base member 6 by means of the screws 69.

Figure 2:
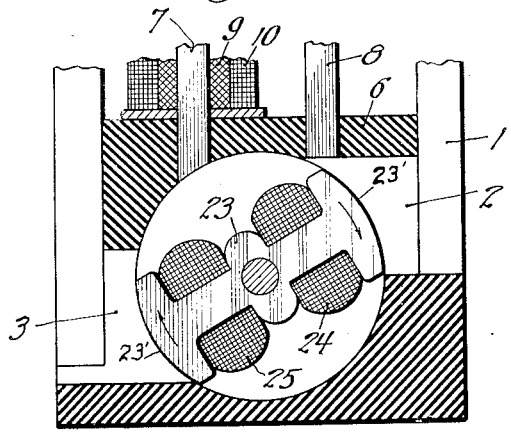
Figure 2 is a view similar to Figure 1, but with parts broken away and showing the rotor element in its cocked or actuated position.
Figure 3:
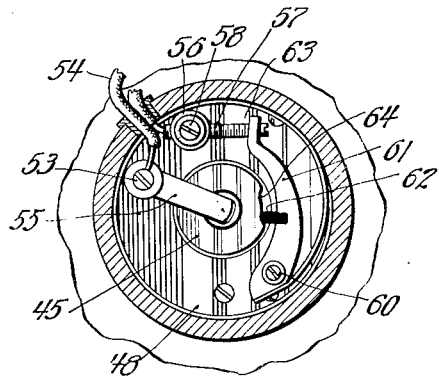
Figure 3 is a sectional view of a portion of the magneto substantially on the line 3—3 of Figure 4, looking in the direction of the arrows.

The operation of the device is as follows:

Assuming that the rotor is in normal position, which is substantially as in Fig. 1, the magnetic lines will pass from the pole 3 of the magnet through the adjacent portion of the armature or core 23, through the legs 7 and 8 of the core 4, through the pole piece 2, and to the opposite pole of the magnet 1. As the rotor is now rotated in a counter-clockwise direction, as viewed in Fig. 1, to the position shown in Fig. 2, by means of some movable element of the mechanism engaging the trigger 31, the magnetic lines passing through the core 4 will be interrupted, thus tending to create an impulse of current in the primary and also in the secondary of the transformer coils. At the time the armature 23 moves to a position to interrupt the magnetic lines passing through the core 4, it establishes a path for the magnetic lines between pole pieces 2 and 3. Thus there is a surge of current set up in the coils 24 and 25 which tends to augment the current in coil 9.

During the movement of the rotor from its normal to its cocked position, contacts 63 and 57 will be in engagement, but as the rotor approaches its cocked position, the follower 62 will ride out of the depression 64, and contacts 63 and 57 will be separated, thus tending to hasten the dying down of the magnetic flux through the core 4. It is not desired that this cocking movement should be effective to create a high potential impulse, and the interrupter is caused to function just prior to the return movement of the rotor in order that the impulse or wave created by the return movement of the rotor may build up practically from a zero value. When the rotor has reached its cocked position, the movable element engaging the trigger 31 will release the trigger and the rotor will be snapped back to its normal position under the influence of the springs 37 and 39.

At the beginning of this return movement, contacts 63 and 57 will come into engagement and will remain in engagement until the rotor has practically reached its normal position when they will again be separated. Thus during the first part of the return movement of the rotor, the magnetic lines will pass from pole piece 3, through the armature core 23, and pole piece 2. During this return rotary movement of the rotor, an impulse of current will be created in the coils 24 and 25 and also in the coil 9 of the transformer. This will act to set up in the core 4 magnetic lines extending in a certain direction.

As the rotor approaches its normal position, the armature 23 is no longer immediately adjacent to the pole piece 2, but one end thereof is now in a position to bridge the gap between the pole piece 3 and the leg 7 of the core 4. The magnetic lines will now pass from the pole piece 3, through one end of the armature 23, through leg 7, leg 8, and pole piece 2 to the other pole of the magnet.

It will thus be observed that a very quick change in the magnetic flux takes place through the core 4, and this change of the magnetic flux in the core creates in the primary coil 9 an impulse of current which will be augmented by the discharge from the condenser 67 arranged in parallel with the interrupter contacts 63 and 57. It will be recalled that the interrupter contacts open as the rotor approaches its normal position.

Due to the very rapid change of the magnetic lines in the cores 4 and 23, a relatively high potential impulse is created in the primary coil 9, and a very hight potential impulse is created in the circuit of the secondary coil 10. Coil 10, in the usual manner, is grounded at one end, the other end extending to spark plugs or distributor contacts, as indicated at 68.

Although in the above description and the accompanying drawings but one embodiment of the applicant's invention is disclosed, it is to be understood that various modifications are contemplated, and that the invention is to be limited merely by the scope of the appended claims.

What I claim is new and desire to secure by Letters Patent of the United States is:

1. In a magneto, a pair of spaced pole pieces, a coil, a core for said coil, one end of said core being adjacent to one of said pole pieces, the other end of said core being spaced from the other of said pole pieces, a rotor having an armature so arranged that in one position it bridges the space between said pole pieces, and in another position bridges the said space between one end of said core and one of said pole pieces, a coil on said armature, said coils being in a series circuit, and a third coil in inductive relation to said first mentioned coil.

2. In a magneto, a pair of spaced pole pieces, a coil, a core for said coil, one end of said core being adjacent to one of said pole pieces, the other end of said core being spaced from the other said pole piece, a rotor having an armature provided with a segmental portion, means for oscillating said rotor, said armature being so arranged that in one extreme position it bridges the space between said pole pieces, and in the other extreme position the segmental portion bridges the said space between one end of said core and one of said pole pieces, a coil on said armature, said coils being in a series circuit, and an interrupter for breaking said series circuit as said armature approaches its last mentioned extreme position.

3. In a magneto, a magnet, a pair of spaced pole pieces therefor, a coil, a core for said coil, one end of said core being adjacent to one of said pole pieces, the other end of said core being spaced from the other of said pole pieces, a rotor having a segmental portion, and a coil on said rotor electrically connected to said first named coil, said parts being arranged whereby in one position of said rotor the lines of force from said magnet pass through said rotor and cut said coil, and in the other position of said rotor the lines of force from said magnet pass through said core and through the segmental portion of said armature substantially without cutting the coil on said armature.

4. In a magneto, a pair of spaced pole pieces, a coil, a core for said coil, one end of said core being adjacent to one of said pole pieces, the other end of said core being spaced from the other said pole piece, a rotor armature, tension means tending to maintain said armature in normal position where it bridges the space between one end of said core and one of said pole pieces, means for moving said armature to cocked position, said armature being arranged to bridge the space between said pole pieces when in cocked position, a coil on said armature, said mentioned coils being in a series circuit, and an interrupter for breaking said series circuit as said armature approaches normal position.

5. In a megneto, a first core structure constituting a main magnetic path, both ends of which terminate adjacent a rotor, a second core structure constituting a secondary magnetic path, having one end connected to the first core structure, the other end of said second core structure also terminating adjacent said rotor, said first core stucture having a source of magnetomotive force, a plurality of coils on said second core structure, and a rotor having peripheral segments adapted to span adjacent ends of said first mentioned and second core structures, said rotor having coils connected in series with one of said coils on said second core structure.

6. In a magneto, a first core structure constituting a main magnetic path, both ends of which terminate adjacent a rotor, a second core structure constituting a secondary magnetic path, having one end connected to the first core structure, the other end of said second core structure also terminating adjacent said rotor, said first core structure having a source of magnetomotive force, a plurality of coils on said second core structure, a rotor having peripheral segments adapted to span adjacent ends of said first mentioned and second core structures, said rotor having coils connected in series with one of said coils on said second core structure, and means for interrupting the connection between the coils of said rotor and coils on said second core as said rotor approaches spanning position.

In testimony whereof, I hereunto subscribe my name this 27th day of January, 1922.

WILLIAM W. HAWKINS.